US012587873B2

(12) United States Patent
Darwish

(10) Patent No.: US 12,587,873 B2
(45) Date of Patent: Mar. 24, 2026

(54) SYSTEM, METHOD, AND MEDIUM FOR NETWORK DRIVE TESTING VIA SELF-DRIVING VEHICLE

(71) Applicant: RAKUTEN SYMPHONY, INC., Tokyo (JP)

(72) Inventor: Ahmed Darwish, Tokyo (JP)

(73) Assignee: RAKUTEN SYMPHONY, INC., Tokyo (JP)

( * ) Notice: Subject to any disclaimer, the term of this patent is extended or adjusted under 35 U.S.C. 154(b) by 388 days.

(21) Appl. No.: 18/248,244

(22) PCT Filed: Sep. 16, 2022

(86) PCT No.: PCT/IB2022/058747
§ 371 (c)(1),
(2) Date: Apr. 7, 2023

(87) PCT Pub. No.: WO2024/057071
PCT Pub. Date: Mar. 21, 2024

(65) Prior Publication Data
US 2024/0373262 A1 Nov. 7, 2024

(51) Int. Cl.
*H04W 24/06* (2009.01)
*H04W 4/024* (2018.01)

(52) U.S. Cl.
CPC ........... *H04W 24/06* (2013.01); *H04W 4/024* (2018.02)

(58) Field of Classification Search
CPC ..... H04W 24/06; H04W 4/024; H04W 4/029; H04W 4/40; G08G 1/0112; G08G 1/202

USPC .......................................................... 455/423
See application file for complete search history.

(56) References Cited

U.S. PATENT DOCUMENTS

| | | | | |
|---|---|---|---|---|
| 2012/0142347 A1* | 6/2012 | Morad | .................. | H04W 60/00 |
| | | | | 455/435.1 |
| 2018/0205631 A1* | 7/2018 | Chow | .................. | H04W 24/10 |
| 2019/0354111 A1* | 11/2019 | Cheng | .................. | G05D 1/0011 |
| 2022/0086069 A1* | 3/2022 | Maseedu | .............. | H04W 24/08 |
| 2022/0256371 A1* | 8/2022 | Lekutai | ................. | H04W 24/08 |

OTHER PUBLICATIONS

Yukihiko Okumura, "A change in development of are search and development "electric test vehicle" which supports evolution of mobile communication", NTT DOCOMO Technical Journal, Jan. 31, 2021, p. 45-p. 66, vol. 28, No. 4, 23pp.
International Search Report and Written Opinion in PCT Application No. PCT/IB2022/058747, mailed Dec. 20, 2022, 9pp.

* cited by examiner

*Primary Examiner* — Hirdepal Singh
(74) *Attorney, Agent, or Firm* — HAUPTMAN HAM, LLP

(57) ABSTRACT

A trigger associated with a network event is received. Based on the received trigger, a location associated with the network event is mapped. Computer navigation instructions are generated, based on the received trigger and location, to be used by a self-driving vehicle to collect network data associated with the network event. A self-driving vehicle is selected among a plurality of self-driving vehicles and deployed to collect network data based on the trigger. Network data collected by the self-driving vehicle is received and a network report is automatically generated to be used to adjust a network configuration.

17 Claims, 2 Drawing Sheets

100

SYSTEM, METHOD, AND MEDIUM FOR NETWORK DRIVE TESTING VIA SELF-DRIVING VEHICLE

RELATED APPLICATIONS

The present application is a National Phase of International Application Number PCT/IB2022/058747, filed Sep. 16, 2022.

TECHNICAL FIELD

The present disclosure relates generally to the field of mobile data networks, and more specifically to the testing and maintenance and improvement of mobile network service via self-driving vehicles.

BACKGROUND

Network testing has been conducted using manned vehicles in order to collect network data associated with mobile communication networks. However, as communication networks become more common in areas that are not accessible by manned vehicles, for example, because of size constraints of the vehicles, danger to human drivers, and the like, a need has arisen for network drive testing in these areas which are inaccessible by manned vehicles.

BRIEF DESCRIPTION OF THE DRAWINGS

The present disclosure can be understood from the following detailed description when read with the accompanying figures. Unless otherwise specified, various features are not drawn to scale and are used for illustration purposes only. Moreover, the dimensions of various features may be increased or decreased for clarity purposes.

DETAILED DESCRIPTION

Figure 1:
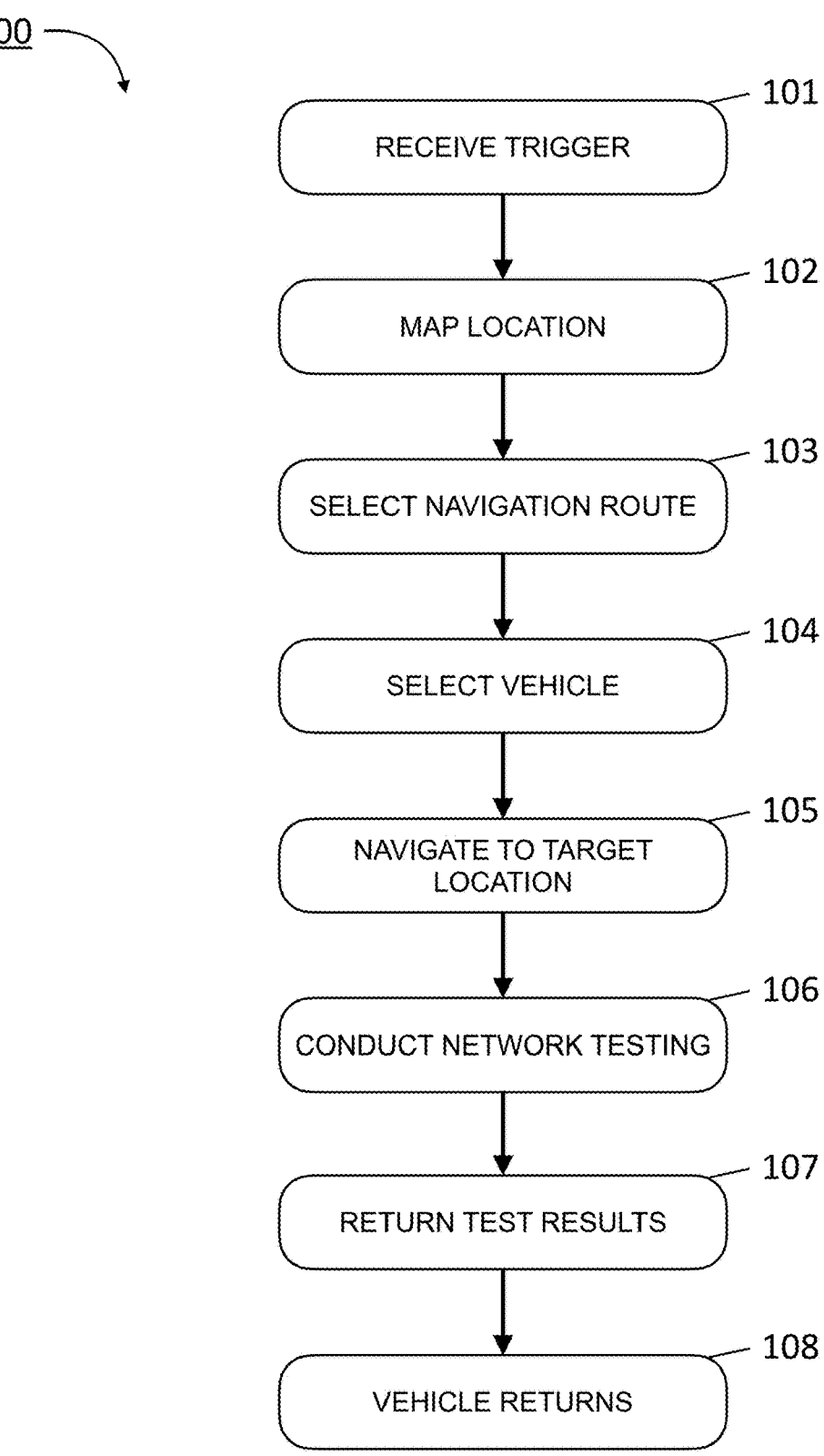
FIG. 1 is a flowchart of exemplary operations suitable for network drive testing of a network via a self-driving vehicle in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the connections of a first feature to a second feature in the description that follows may include embodiments in which the first and second features are directly connected, and may also include embodiments in which additional features may be connected between the first and second features, such that the first and second features may not be directly connected. In addition, the present disclosure may repeat reference numerals and/or letters in the various examples. This repetition is for the purpose of simplicity and clarity and does not in itself dictate a relationship between the various embodiments and/or configurations discussed.

Network testing using manned vehicles such as cars and the like, helps test network attributes, such as signal strength and network robustness, of mobile networks that cover areas too large to test without the aid of a vehicle. A vehicle can be fitted with network measuring equipment capable or testing, for example, network signal strength, and driven by a driver on public roads, for example, in order to collect data associated with the network in various areas of the network. Manned vehicles, such as cars and trucks, are restricted to areas where these vehicles can travel, such as certain public and private roads, and are not able to conduct network testing in areas where it is impossible for the vehicles to travel. Further, manned vehicle network testing may also be restricted in areas where the risk to human life is too high to conduct network testing, such as disaster areas, dangerous mountain roads, icy surfaces, and the like. Additionally, the number of vehicles able to test the network simultaneously are restricted to the number of human drivers available.

In contrast, network drive testing using a vehicle that is self-driving will help with the flexibility, availability, accuracy, and precision of network testing. Because self-driving vehicles are not required to accommodate a driver, and loss of a vehicle does not endanger a driver (because there is no driver), self-driving vehicles are able to conduct network drive testing in areas inaccessible to manned vehicles and provide a greater amount of network testing data previously inaccessible using manned vehicles. This helps to improve network data collection while also increasing safety and reducing data collection times. By improving network data collection, network configurations can be adjusted more effectively to provide improved (e.g., increased) network coverage and improved service (e.g., higher network speed and increased network reliability).

In this application, a self-driving vehicle is a vehicle that is capable of complete autonomous navigation without human intervention. In some embodiments, self-driving vehicles according to this disclosure are capable of being automatically deployed, conduct testing autonomously, and return to a parking location designated in advance, or designated in real-time.

FIG. 1 is a flowchart of exemplary method 100 suitable for network drive testing of a network via a self-driving vehicle in accordance with some embodiments. Method 100 selects the appropriate self-driving vehicle for the location to be mapped. That is, method 100 takes into consideration the terrain, dimensions of navigation paths, length of navigation paths, and location of deployable self-driving vehicles in order to quickly, accurately, and efficiently drive test the associated network autonomously.

In operation 101, a trigger associated with a network event type and a location to be mapped is received. In some embodiments, the trigger associated with the network event may be received from network hardware or software, such as a network radio node. In some embodiments, the trigger is received via user input. In response to receiving the trigger, a test work order is issued, including data associated with the type of network event, the location the event, and instructions for network drive testing associated with the event via a self-driving vehicle.

In some embodiments, the trigger is associated with a planned network event. That is, the time and place for the occurrence of the event is controllable. For example, when a new node is added to the network, a new cluster of nodes is added to the network, or other network changes are made to accommodate planned events where mobile network users may form temporary gatherings that could affect network performance for which network adjustments are made prior to the event. Network adjustments may include, but are not limited to, adding new radio transmitters, microwave antennas, routing equipment, or other hardware and/or software for the purpose of managing a sudden increase in network load. In some embodiments, the increase in network load is temporary with a set termination time. In some embodiments, the increase may be long-term without a set termination time.

In some embodiments, the trigger is associated with an unplanned network event. That is, an event in which the time and/or place of the event is not controllable planned. For example, a site alarm issued in response to unexpected network failure and/or potential failure of hardware and/or software, ad-hoc complaints that are received from a network customer, high-priority events that (unexpectedly) require additional network resources, or unexpected natural disasters that affect the network. Site alarms may include events such as a downed site, degradation in accessibility to the network, and issues with retainability and mobility key performance indicators (KPIs). Ad-hoc complains may additionally include complaints from VIP users. High-priority events may further include events such as VIP gatherings (e.g., visiting foreign dignitaries), concerts, and/or sporting events. Natural disasters may include events such as earthquakes, extreme weather (e.g., typhoons and hurricanes), tidal waves, floods, and the like.

In operation 102, the target location is analyzed and mapped based on the test work order. The test work order includes instructions related to one or more types of network drive testing that are to be conducted. For example, network drive testing types may include: a continuous voice call test, a video call test, a file download test, a file upload test, a browser test, a video streaming test, a voice over LTE (VOLTE) call test, and the like.

In operation 103, a set of computer instructions defining a navigation route is generated for network drive testing. The route is determined based on at least the location of the network event and the network tests to be conducted which are specified by the test work order. In some embodiments, an artificial intelligence (A.I) model (e.g., deep learning, machine learning, or other appropriate model) prioritizes the network tests based on the event type of the trigger, and selects a navigation route to conduct the tests. That is, the A.I. model determines whether the certain network tests take priority over any other prior-scheduled network tests. In some embodiments, the A.I model generates the computer instructions defining the navigation route.

In operation 104, a self-driving vehicle is selected to conduct network drive testing according to at least the test work order, event type, event location, and generated navigation route. In some embodiments, the self-driving vehicle is selected based on its proximity to the location of the network event. In some embodiments, the self-driving vehicle is selected based on its type. That is, the vehicle's dimensions, weight, or other relevant physical and/or performance attributes. For example, a vehicle with off-road capabilities may be selected for areas without roads, or a small vehicle may be selected for areas where it is impossible for manned vehicles to travel due to size constraints. In some embodiments, a self-driving vehicle is selected from among a plurality of self-driving vehicles in the same parking location. In some embodiments, a self-driving vehicle is selected from among a plurality of self-driving vehicles distributed among two or more locations.

In operations 105 and 106, the selected self-driving vehicle receives the test work order, and autonomously navigates to the target location to conduct the network testing specified by the test work order. In some embodiments, network testing is conducted at the navigation destination. In some embodiments, network testing is conducted along the navigation route at specified points. In some embodiments, network testing is conducted along the navigation route and at the navigation destination.

In operation 107, upon completion of the network testing, the results are reported by the self-driving vehicle. In some embodiments, the self-driving vehicle saves a log file and transmits the file to a predetermined recipient or recipients. In some embodiments, the log file may be saved in a text-based format or a proprietary format (e.g., ppt or docx).

In operation 108, once the self-driving vehicle completes the network driving test, it will automatically navigate to a predetermined location. In some embodiments, the vehicle will navigate using a global positioning system (GPS). In some embodiments, the self-driving vehicle will navigate to a predetermined parking area. In some embodiments, the self-driving vehicle will use appropriate navigation other than GPS.

Figure 2:
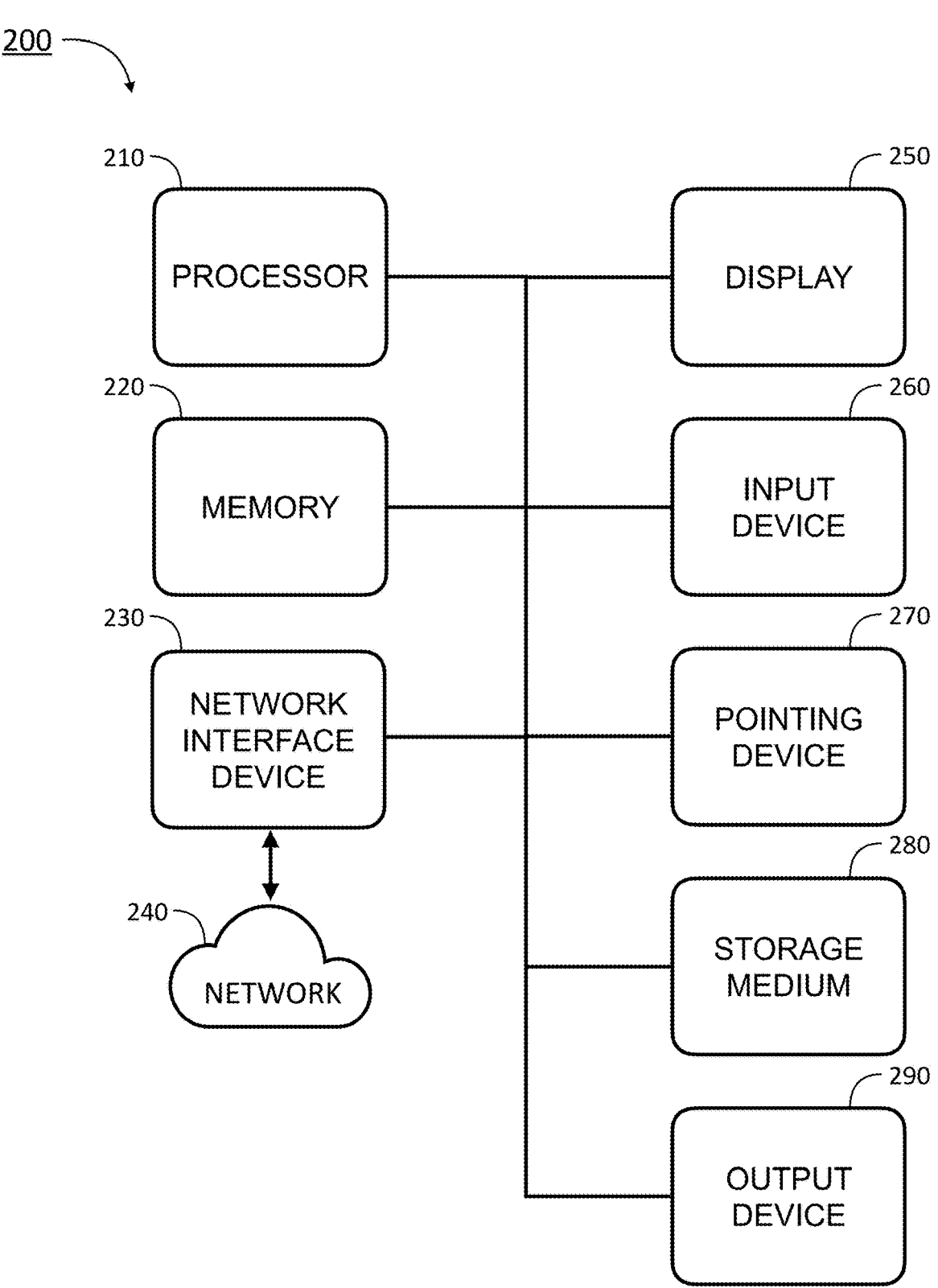
FIG. 2 is a block diagram of an electronic device suitable for network drive testing of a network via a self-driving vehicle in accordance with some embodiments.

FIG. 2 is a block diagram of components of electronic device 200, according to some embodiments, configured to read instructions from a non-transitory computer-readable medium (e.g., machine-readable and/or computer-readable) and perform any of the operations disclosed herein, in whole or in part. The electronic device includes at least one or more of: a processor 210, a memory 220 (e.g., RAM/ROM), a network interface device 230 (e.g., ethernet connection, wireless connection, etc) configured to connect to a network 240 (e.g., LAN, WAN, mobile network, wired or wireless), a display 250 (e.g., LCD, LED, OLED, CRT, etc.), an input device 260 (e.g., keyboard, touchscreen, etc.), a pointing device 270 (e.g., mouse, trackpad, tablet, motion-control device, etc.), a storage medium 280 (e.g., hard drive, optical drive, solid-state storage device), and an output device 290 (e.g., audio, optical output, etc.). The components of electronic device 200 may be any suitable combination of physical hardware or virtualized hardware, and/or contained within one device or spread across multiple devices or application platforms.

The invention claimed is:

1. A system for network drive testing of a network via a self-driving vehicle, the system comprising:
   a memory storing instructions; and
   at least one processor configured by the instructions to perform operations comprising:
      receiving a trigger associated with a network event;
      mapping, based on the received trigger, a location associated with the network event;
      generating, based on the received trigger, a set of computer navigation instructions to be used by the self-driving vehicle to conduct at least one network test associated with the location associated with the network event;
      selecting, based on the set of computer navigation instructions, a self-driving vehicle among a plurality of self-driving vehicles;
      deploying the selected self-driving vehicle to autonomously conduct the at least one network test associated with the network event and collect a result of the at least one network test;
      receiving a result of the at least one network test collected by the self-driving vehicle; and
      automatically generating, using the received result of the at least one network test, a network report to be used to adjust a configuration of the network,
      wherein an artificial intelligence (A.I.) model sets a priority of the at least one network test based on an event type of the trigger.

2. The system of claim 1, further comprising:

issuing a test work order in response to receiving the trigger, wherein the test work order comprises data associated with a type of network drive test, the location associated with the network event, and the set of computer navigation instructions.

3. The system of claim 2, wherein the instructions for network drive testing comprise at least one of: a continuous voice call test, a video call test, a file download test, a file upload test, a browser test, a video streaming test, or a voice over LTE (VOLTE) call test.

4. The system of claim 1, wherein the A.I. model generates the set of computer navigation instructions and selects a navigation route to conduct the at least one network test associated with the network event.

5. The system of claim 1, wherein the A.I. model selects the self-driving vehicle based on the proximity of the self-driving vehicle to the location associated with the network event.

6. The system of claim 1, further comprising:

upon completing the network driving test, automatically navigating the self-driving vehicle to a predetermined location, wherein the predetermined location is not part of the set of computer navigation instructions.

7. A computer-implemented method for network drive testing of a network via a self-driving vehicle, the method comprising:

receiving a trigger associated with a network event;

mapping, based on the received trigger, a location associated with the network event;

generating, based on the received trigger, a set of computer navigation instructions to be used by the self-driving vehicle to conduct at least one network test associated with the location associated with the network event;

selecting, based on the set of computer navigation instructions, a self-driving vehicle among a plurality of self-driving vehicles, wherein the selecting of the self-driving vehicle is based on capabilities of the self-driving vehicle;

deploying the selected self-driving vehicle to autonomously conduct the at least one network test associated with the network event and collect a result of the at least one network test;

receiving a result of the at least one network test, collected by the self-driving vehicle; and automatically generating, using the received result of the at least one network test, a network report to be used to adjust a configuration of the network, wherein an artificial intelligence (A.I.) model sets a priority of the at least one network test based on an event type of the trigger.

8. The method of claim 7, further comprising:

issuing a test work order in response to receiving the trigger, wherein the test work order comprises data associated with a type of the network event, the location associated with the network event, and the set of computer navigation instructions.

9. The method of claim 8, wherein the instructions for network drive testing comprise at least one of: a continuous voice call test, a video call test, a file download test, a file upload test, a browser test, a video streaming test, or a voice over LTE (VOLTE) call test.

10. The method of claim 7, wherein the A.I. model generates the set of computer navigation instructions and selects a navigation route to conduct the at least one network test associated with the network event.

11. The method of claim 7, wherein the A.I. model selects the self-driving vehicle based on the proximity of the self-driving vehicle to the location associated with the network event.

12. The method of claim 7, further comprising:

upon completing the network driving test, automatically navigating the self-driving vehicle to a predetermined location, wherein the predetermined location is not part of the set of computer navigation instructions.

13. A non-transitory computer-readable medium for network drive testing of a network via a self-driving vehicle, storing instructions that, when executed by at least one processor, cause the at least one processor to perform operations comprising:

receiving a trigger associated with a network event;

mapping, based on the received trigger, a location associated with the network event;

generating, based on the received trigger, a set of computer navigation instructions to be used by the self-driving vehicle to conduct at least one network test associated with the location associated with the network event;

selecting, based on the set of computer navigation instructions, a self-driving vehicle among a plurality of self-driving vehicles, wherein the selecting of the self-driving vehicle is based on capabilities of the self-driving vehicle;

deploying the selected self-driving vehicle to autonomously conduct the at least one network test associated with the network event and collect a result of the at least one network test;

receiving a result of the at least one network test, collected by the self-driving vehicle; and automatically generating, using the received result of the at least one network test, a network report to be used to adjust a configuration of the network, wherein an artificial intelligence (A.I.) model sets a priority of at least one network test based on an event type of the trigger.

14. The non-transitory computer-readable medium of claim 13, wherein the operations further comprise:

issuing a test work order in response to receiving the trigger, wherein the test work order comprises data associated with a type of network drive test, the location associated with the network event, and the set of computer navigation instructions.

15. The non-transitory computer-readable medium of claim 14, wherein the instructions for network drive testing comprise at least one of: a continuous voice call test, a video call test, a file download test, a file upload test, a browser test, a video streaming test, or a voice over LTE (VOLTE) call test.

16. The non-transitory computer-readable medium of claim 13, wherein the A.I. model generates the set of computer navigation instructions and selects a navigation route to conduct the at least one network test associated with the network event.

17. The non-transitory computer-readable medium of claim 13, wherein the A.I. model selects the self-driving vehicle based on the proximity of the self-driving vehicle to the location associated with the network event.

* * * * *